United States Patent
Ulrey et al.

(10) Patent No.: US 7,886,727 B2
(45) Date of Patent: Feb. 15, 2011

(54) VARIABLE VENTURI SYSTEM AND METHOD FOR ENGINE

(75) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 12/472,225

(22) Filed: May 26, 2009

(65) Prior Publication Data

US 2010/0300413 A1 Dec. 2, 2010

(51) Int. Cl.
*F02B 47/08* (2006.01)
*F02M 37/20* (2006.01)

(52) U.S. Cl. .................. 123/568.15; 123/574; 123/516

(58) Field of Classification Search ................. 123/516, 123/518, 520, 568.11, 568.15, 568.17, 568.18, 123/568.21, 568.26, 572, 573, 574
See application file for complete search history.

(56) References Cited

U.S. PATENT DOCUMENTS

| | | | |
|---|---|---|---|
| 3,050,376 A * | 8/1962 | Bishop et al. ................ 422/168 |
| 3,846,980 A * | 11/1974 | DePalma ..................... 60/279 |
| 5,033,574 A | 7/1991 | Kushi et al. |
| 5,207,734 A * | 5/1993 | Day et al. .................... 60/278 |
| 5,373,822 A * | 12/1994 | Thompson .................. 123/520 |
| 5,413,082 A * | 5/1995 | Cook et al. ................. 123/520 |
| 5,460,137 A * | 10/1995 | Zabeck et al. ............... 123/520 |
| 5,611,204 A | 3/1997 | Radovanovic et al. |
| 5,642,698 A | 7/1997 | Diehl et al. |
| 6,267,106 B1 * | 7/2001 | Feucht ................... 123/568.17 |
| 6,343,594 B1 * | 2/2002 | Koeslin et al. ......... 123/568.17 |
| 6,502,397 B1 | 1/2003 | Lundqvist |
| 6,742,335 B2 * | 6/2004 | Beck et al. ................. 60/605.2 |
| 6,851,415 B2 * | 2/2005 | Mahakul et al. ........ 123/568.17 |
| 6,886,545 B1 * | 5/2005 | Holm .................... 123/568.21 |
| 7,036,529 B2 * | 5/2006 | Berggren et al. ............ 137/892 |
| 7,261,096 B2 * | 8/2007 | Berggren et al. ....... 123/568.18 |
| 7,290,536 B2 * | 11/2007 | Lindmark et al. ........... 123/572 |
| 7,353,811 B2 * | 4/2008 | Weisz .................... 123/568.17 |
| 7,426,923 B2 * | 9/2008 | Berggren ............... 123/568.18 |
| 7,543,600 B2 * | 6/2009 | Berggren et al. ............ 137/219 |
| 7,721,530 B2 * | 5/2010 | Holm ......................... 60/283 |
| 2003/0230280 A1 | 12/2003 | Allston et al. |
| 2005/0252481 A1 | 11/2005 | Garner |
| 2008/0066725 A1 | 3/2008 | Berggren |

* cited by examiner

*Primary Examiner*—Thomas N Moulis
(74) *Attorney, Agent, or Firm*—Allan J. Lippa; Alleman Hall McCoy Russell & Tuttle LLP

(57) ABSTRACT

Systems and methods for an engine are described. In one example, a system may include a variable venturi coupled in an intake of the engine; an exhaust gas recirculation system having an exhaust gas recirculation flow path, the exhaust gas recirculation flow path coupled to the variable venturi; and a vacuum-utilizing device or system coupled to the variable venturi. In another example, a method may include coordinating adjustment of an exhaust gas recirculation valve coupled to the exhaust gas recirculation system, a fuel vapor purging valve coupled to the fuel vapor purging system, and the variable venturi in response to operating conditions.

19 Claims, 5 Drawing Sheets

VARIABLE VENTURI SYSTEM AND METHOD FOR ENGINE

FIELD

The present invention relates to combined cooled exhaust gas recirculation system, positive crankcase ventilation system, fuel vapor purge system, and vacuum actuation source for boosted engines via the variable venturi.

BACKGROUND/SUMMARY

Engines may use turbocharging to increase charge density and reduce engine displacement. Further, engines may use exhaust gas recirculation (EGR) to reduce NOx formation, increase fuel economy, and reduce knock. In one particular example, low pressure EGR systems may cooperate with a variable venturi to improve maximum EGR flow when desired based on operating conditions, where a low pressure EGR system is one that taps the exhaust at downstream of a turbocharger. The venturi creates vacuum to draw the exhaust into the engine air inlet stream.

The inventors herein have recognized that in addition to improving EGR operation, other vacuum-utilizing devices or systems may be coupled with the venturi in order to take advantage of its vacuum source; for example, the positive crankcase ventilation (PCV) system, the fuel vapor purge (FVP) system, or the vacuum amplifier for vacuum-powered actuators. For example, with regard to PCV systems coupled with the venturi it is possible to establish a single path PCV system (unidirectional) independent of fluctuations of the manifold pressure, even under boosted conditions. Likewise, when the fuel vapor purge system is coupled with the venturi, a single path (unidirectional) fuel vapor purge system may be established independent of fluctuations in manifold pressure, thereby avoiding reverse fuel canister purge flows.

However, the inventors herein have also recognized the interdependence in the configuration described above, where adjustment of one system can affect vacuum provided to, or flow of, another system. For example, changes in the EGR system and/or variable venturi can cause flow changes in the fuel vapor purging system.

Thus, in one approach, a method of controlling engine operation of an engine having an exhaust gas recirculation system and a fuel vapor purging system is provided. The method includes delivering exhaust gas recirculation flow from the exhaust gas recirculation system to a variable venturi coupled in an intake of the engine; delivering fuel vapor flow from the fuel vapor purging system to the variable venturi coupled in an intake of the engine; and coordinating adjustment of an exhaust gas recirculation valve coupled to the exhaust gas recirculation system, a fuel vapor purging valve coupled to the fuel vapor purging system, and the variable venturi in response to operating conditions.

In this way, it is possible to reduce inadvertent changes to fuel vapor purge flow (e.g., through adjustment of the fuel vapor purging valve) while maintaining desired EGR flow operation (e.g., through adjustment of the variable venturi and/or EGR valve).

While the above example relates to the particular situation of EGR and fuel vapor purging interacting with one another through the variable venturi, various other examples may be encountered as noted below herein. Further, the above examples may be applied to systems with two or more devices or systems coupled to the variable venturi.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
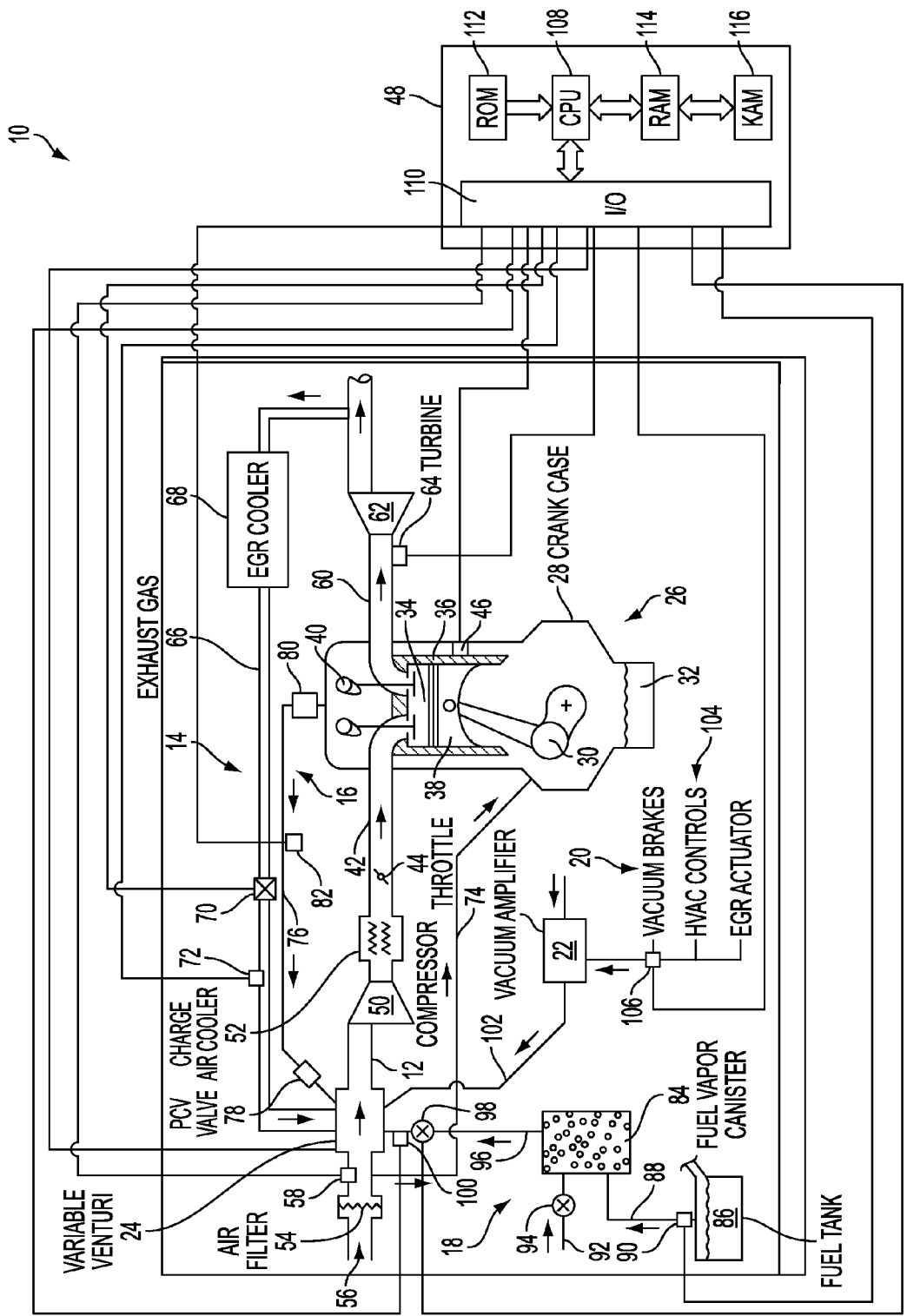
FIG. 1 shows a partial engine view.
Figure 2:
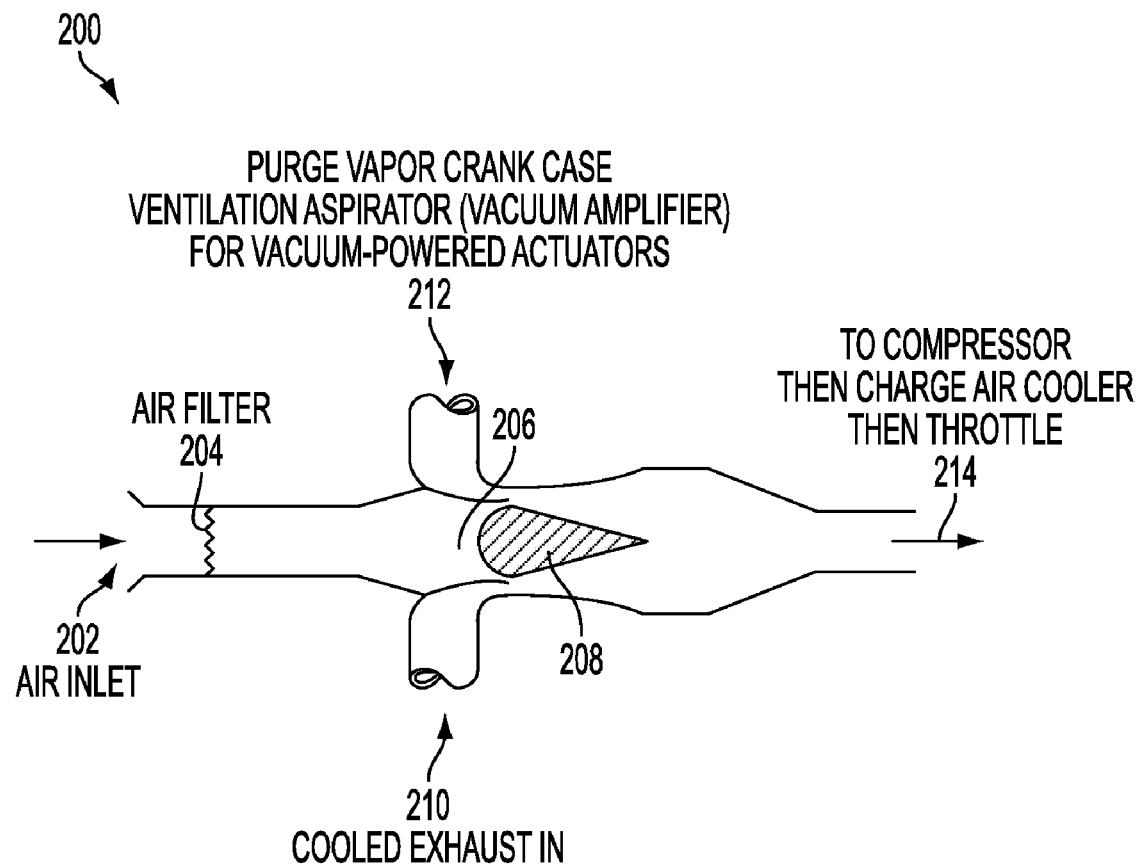
FIG. 2 shows a schematic depiction of a variable venturi.
Figure 3:
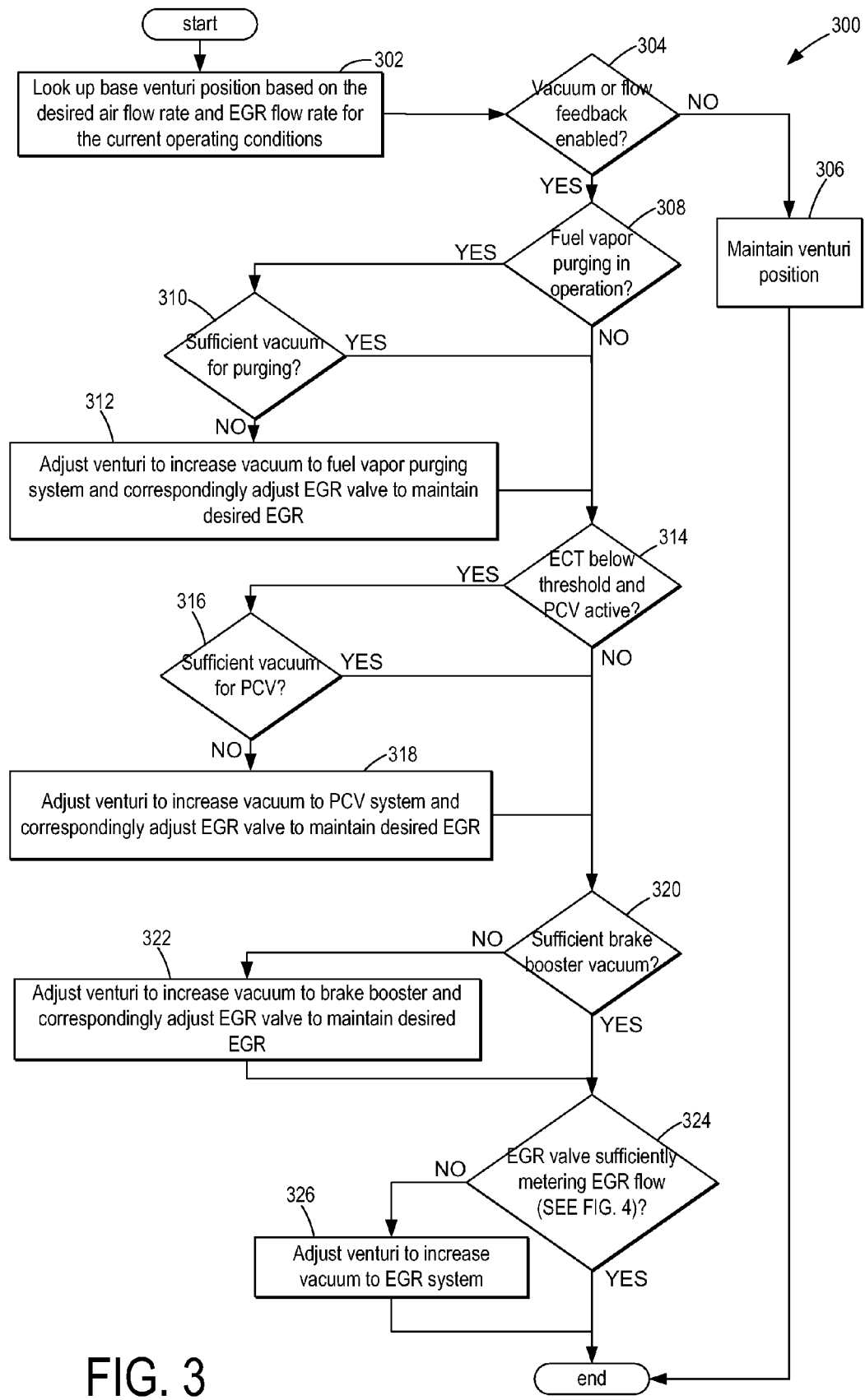
FIG. 3 shows the overall control for EGR, where the variable venturi is also adjusted to maintain the minimum vacuum needed for the other devices.
Figure 4:
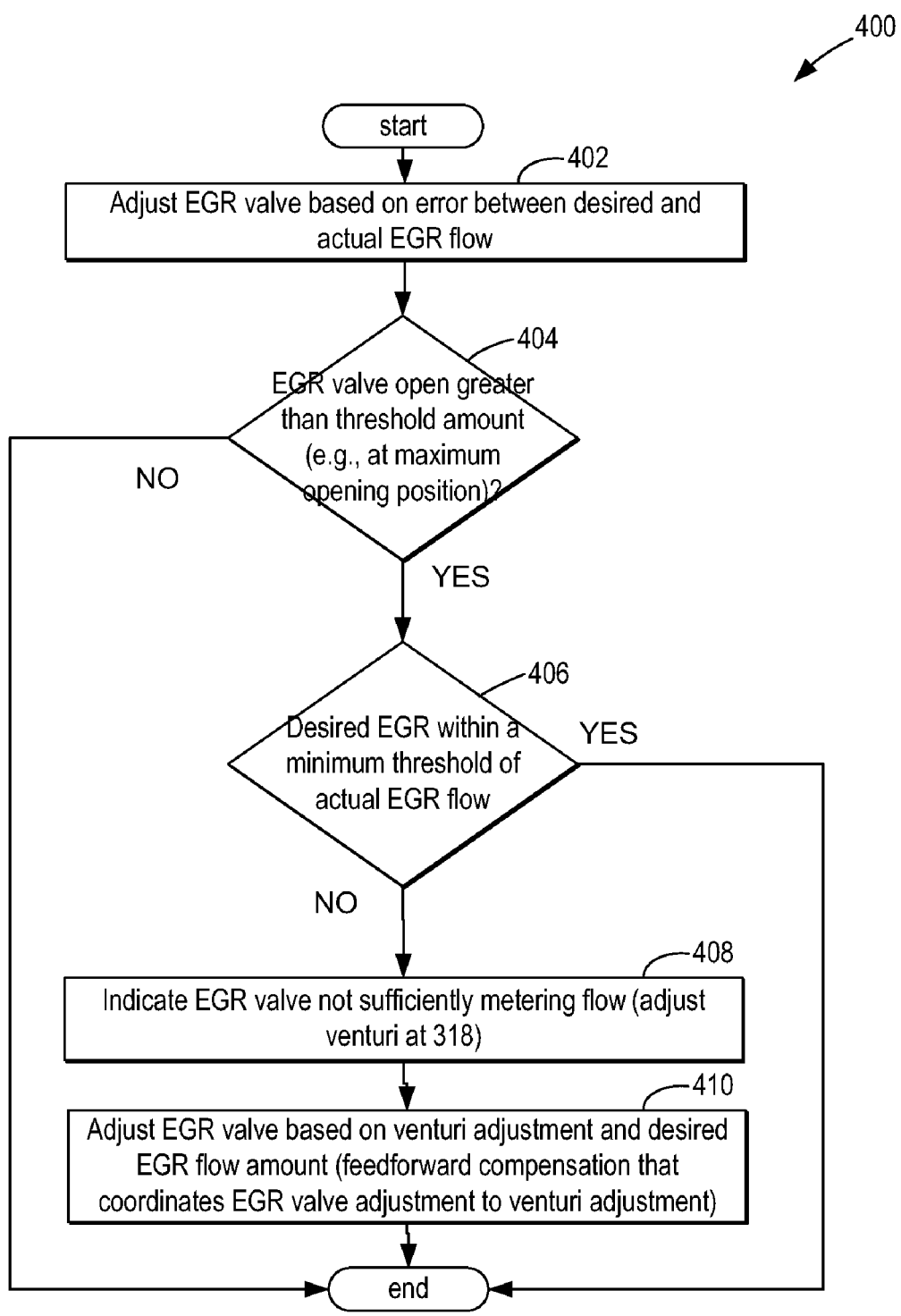
FIGS. 4-5 show additional control actions for additional coordinating (e.g., coordination that is not related to minimum vacuum levels, but to other constraints).
Figure 5:
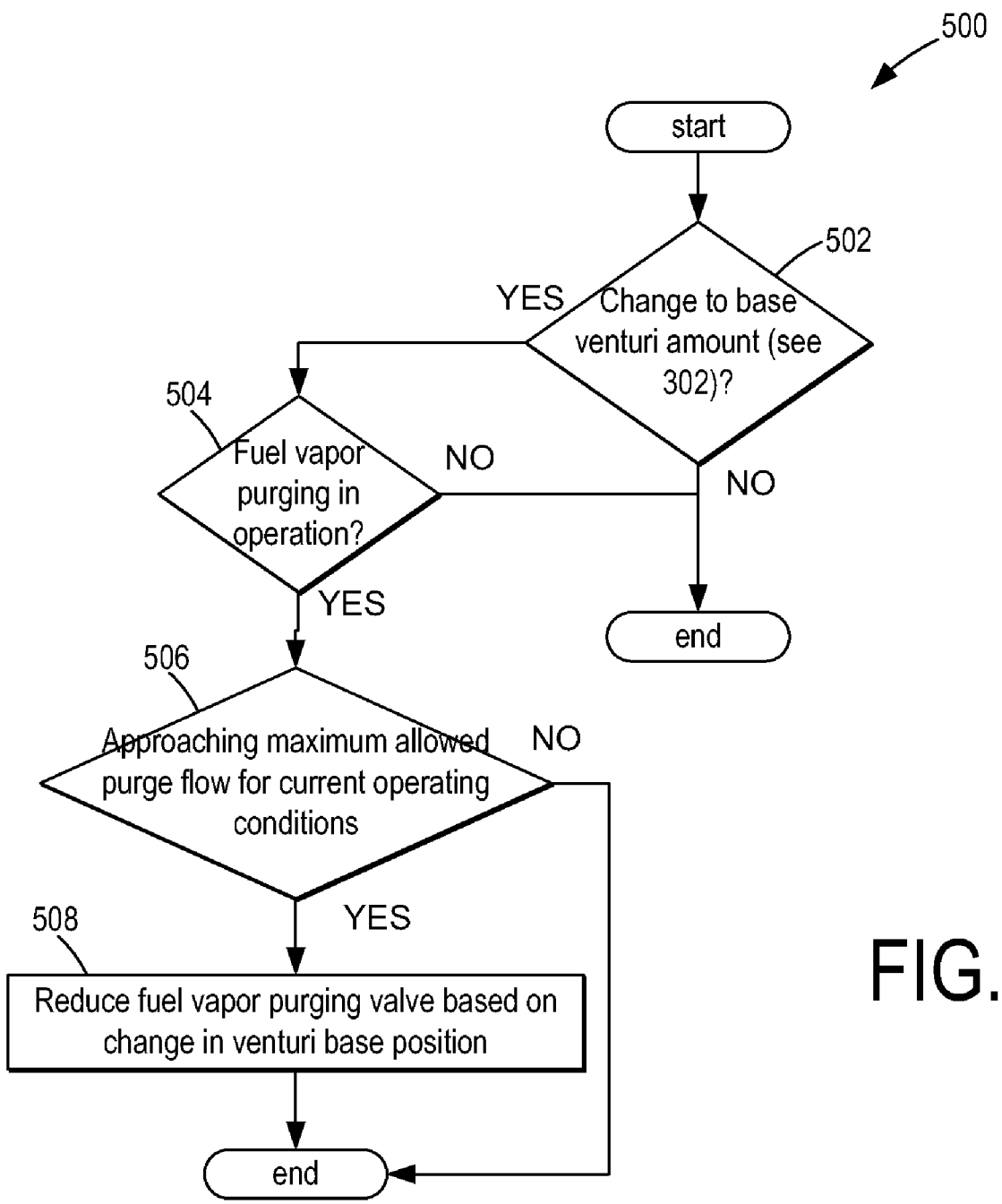

The following description relates to systems and methods for an inter-connected venturi-based EGR system, crankcase ventilation system, fuel vapor purge system, brake booster, and/or vacuum amplifier system, the system depicted schematically in FIG. 1. FIG. 2 shows additional details of an example variable venturi actuator that may be used in the system of FIG. 1. The vacuum generated by the variable venturi provides flow/vacuum to one or more of the systems. Example embodiments for controlling the EGR system, crankcase ventilation system, fuel vapor purge system and/or vacuum amplifier system in coordination with the variable venturi is depicted in FIGS. 3-5.

Referring now to FIG. 1, it shows an example system configuration of a multi-cylinder engine, generally depicted at 10, which may be included in a propulsion system of an automobile. The engine may include a plurality of vacuum-utilizing devices or systems coupled to the engine intake 12, such as an exhaust gas recirculation (EGR) system 14, a crankcase ventilation system 16, a fuel vapor purge system 18, a brake booster 20, and/or a vacuum amplifier 22. The vacuum amplifier may be of the design shown in U.S. Pat. No. 5,291,916. In the example depicted in FIG. 1, the systems are interconnected through a common variable venturi 24.

Engine 10 may include a lower portion of the engine block, indicated generally at 26, which may include a crankcase 28 encasing a crankshaft 30 with oil well 32 positioned below the crankshaft. The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injectors 40 and intake air from intake manifold 42 which is positioned downstream of throttle 44. The engine block 26 may also include an engine coolant temperature (ECT) sensor 46 input into an engine controller 48 (described in more detail below herein).

Throttle 44 controls the airflow entering intake manifold 42 and may be preceded upstream by compressor 50 followed by charge air cooler 52. The variable venturi 24 may be positioned upstream of compressor 50 in the air flow into compressor 50. Compressor 50 may be equipped with a compressor bypass valve. The variable venturi uses the engine airflow to generate a vacuum (pressure drop) that is used to advantage as described herein. An air filter 54 may be positioned upstream of variable venturi 24 and may filter air entering intake passage 56. A mass air flow (MAF) sensor 58 may be disposed on intake passage 12 between air filter 54 and venturi 24. MAF sensor 58 may be connected to controller 48.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it. The wastegate may be vacuum actuated. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 48. The variable venturi 24, may be located downstream of the exhaust gas recirculation conduit 66, pulling a portion of exhaust combustion gases exiting turbine 62 back into combustion chamber 34 via the EGR conduit 66. Exhaust gas traveling within EGR conduit 66 may be cooled as it passes through EGR cooler 68 which may be located within the EGR conduit 66 and upstream of an adjustable exhaust gas recirculation valve 70 followed by an EGR pressure sensor 72 which may be connected to controller 48. The adjustable EGR valve 70 controls the flow rate of exhaust gases traveling in the EGR conduit 66 and may be located on the EGR conduit upstream from where the EGR conduit is coupled to the variable venturi 24. The EGR valve 70 may be a vacuum actuated valve. While this example shows exhaust gas being drawn from downstream of the turbine (low pressure EGR), it may also be drawn from upstream of the compressor, or combinations thereof, if desired. In another example, the position of EGR valve 70 may be monitored and controlled by controller 48.

As noted above, various vacuum-utilizing devices or systems may also be coupled to the variable venturi 24, in addition to EGR. Coupling vacuum-utilizing devices or systems with the venturi upstream of the compressor may lead to a simplification of engine systems and components and more robust mass air flow calculations. For example, vacuum-utilizing systems may experience only vacuum, and not pressures above atmosphere under boosting conditions, as they otherwise would if coupled to the engine intake manifold. As another example, vacuum-utilizing devices or systems coupled to the venturi likewise only draw flow into the intake system, and thus further enable the increased robustness in airflow estimation as the airflow measurement is affected only in one direction. Note, however, that is some examples, one or more vacuum-utilizing devices may also be coupled to the engine intake manifold, such as positive crankcase ventilation, for example.

In the example of FIG. 1 a positive crankcase ventilation system 16 is coupled to the variable venturi 24. The crankcase ventilation system 16 draws air into crankcase 28 via conduit 74 which may be connected to the air intake passage 12 between air filter 54 and variable venturi 24. The crankcase ventilation system vents air out of the crankcase via conduit 76 which includes a one-way PCV valve 78 to provide continual evacuation of gases from inside the crankcase 28 before connecting to the variable venturi 24. In the current embodiment, the variable venturi 24 may assist the flow in the crankcase ventilation system. As shown in the example of FIG. 1, the PCV conduit 76 may include a uni-directional oil separator 80 which filters oil from vapors exiting crankcase 28 before they re-enter the intake system 12. The PCV conduit 76 may also include a vacuum sensor coupled to the PCV system. In the example of FIG. 1, a vacuum sensor 82 is disposed along conduit 76 between oil-separator 80 and PCV valve 78. Vacuum sensor 82 may be connected to controller 48.

By coupling the PCV system with the venturi 24 upstream of the compressor, rather than directed PCV flow to the intake manifold 42, it is possible to establish a single path (unidirectional) PCV system, independent of variation in manifold pressure. Thus, a single oil separator may be used since the PCV system's air intake conduit, coupled to the venturi, is substantially maintained at a lower pressure than the crankcase, even under boosted conditions (where intake manifold pressure may be significantly above crankcase pressure). Further, by coupling the PCV system with the venturi, gasses do not enter the engine via the PVC system thus enabling a simpler and more robust MAF-based air charge calculation. In other words, PCV flow can be estimated more predictably since the direction of flow is maintained and reliably known, with significantly less pressure fluctuations, thereby leading to less overall variation in PCV flow during engine operation.

While in the example of FIG. 1 the PCV system is coupled to the variable venturi, in other examples it may be coupled to the intake manifold, if desired, as noted above.

As shown in FIG. 1, the variable venturi 24 may be coupled with the fuel vapor purge system, depicted generally at 18. The fuel vapor purge system 18 includes a fuel vapor canister 84 which receives fuel from fuel tank 86 via conduit 88. A fuel tank pressure sensor 90 may be disposed along fuel conduit 88 and connected to controller 48. An air intake conduit 92 containing air intake valve 94 joined to the fuel vapor canister 84 allows air to be drawn into the fuel vapor canister 84. The flow of intake air into the fuel vapor canister 84 is controlled by air intake valve 94. A fuel vapor purging conduit 96 is joined to the fuel vapor canister 84 and may be coupled with variable venturi 24. The variable venturi may generate a vacuum that aids in drawing vapor out of the fuel vapor canister 84 via conduit 96, which may contain a fuel vapor purging valve 98 allowing for flow control in the fuel vapor purge system. The position of the FVP valve 98 may be monitored and controlled by controller 136. As shown in the example of FIG. 1, a fuel vapor purge pressure sensor 100 may be disposed along purge conduit 96 between FVP valve 98 and venturi 24. FVP sensor 100 may be connected to controller 48.

By coupling the fuel vapor purge system with the venturi 24, it is possible to establish a single path (unidirectional) fuel vapor purge system independent of variation in manifold pressure, thereby avoiding reverse fuel canister purge flows even in engine degradation conditions. Further, by coupling the FVP system with the venturi 24, fuel vapor purge flow can be estimated more predictably (e.g., via purge flow sensor 100) since the direction of flow is maintained and reliably known, thereby leading to less overall variation in fuel vapor purge flow during engine operations.

The variable venturi 24 may be coupled downstream with the brake booster 20. In one example, the brake booster 20 may be preceded by a vacuum amplifier 22. In the embodiment shown in FIG. 1, the variable venturi 24 is coupled downstream with vacuum amplifier 22 via conduit 102, supplying a vacuum for the vacuum amplifier 22 which feeds vacuum-powered actuators, depicted generally at 104 (e.g., vacuum brakes, HVAC controls, and EGR actuation (such as valve 70)). As shown in the example of FIG. 1, the brake booster 20 may include a vacuum sensor 106 which may be connected to controller 48. When coupled with the brake booster or vacuum amplifier for vacuum-powered actuators, the venturi supplies a vacuum source even when manifold pressure is boosted above atmospheric pressure, thus lowering the energy threshold of the brake booster or vacuum amplifier.

Controller 48 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 48 may receive various signals from sensors coupled to engine 10, including measurement of inducted mass air flow (MAF) from mass air flow sensor 58; engine coolant temperature (ECT) from temperature sensor 46; PCV pressure from vacuum sensor 82; EGR pressure from vacuum sensor 72; exhaust gas air/fuel ratio from exhaust gas sensor 64; brake booster vacuum from vacuum sensor 106; fuel tank pressure from vacuum sensor 86; and/or fuel vapor purge pressure from vacuum sensor 100. Furthermore, controller 48 may monitor and adjust the positions of the venturi 24 sliding "egg" (described herein); the EGR valve 70, and/or the FVP valve 98, for example. Storage medium read-only memory 112 can be programmed with computer readable data representing instructions executable by processor 108 for performing the methods described below, as well as other variants that are anticipated but not specifically listed.

The above configuration can provide various advantageous interactions. For example, minimum vacuum needed for PCV and/or fuel vapor purging may be around 0.1 bar of vacuum. Further, since the fuel vapor purging and PCV may operate (e.g., flow gasses) during different operating conditions, both would likely not need higher vacuums at the same time. For example, during high ambient temperatures, following recent tank fills, increased fuel vapor purging may be experienced, whereas cold crankcase operation is when fresh air crankcase ventilation may have the greatest use of vacuum (to address crankcase sludge formation).

Similarly, the brake booster utilizes relatively small flows but deeper (larger) vacuums. However, brake aspirators may be used in the system to provide vacuum amplification so that the variable venturi need not supply the entire depth of vacuum.

While the above example describes a plurality of vacuum-utilizing devices or systems that may be advantageously coupled with the variable venturi and/or EGR system, various alternatives may be used. For example, a vacuum generator may be used to power the brakes, or electrically actuated brakes may be used. As another example, various devices may be eliminated, such as the brake booster, PCV system, etc.

FIG. 2 shows a schematic depiction of a variable venturi 200, which may be used as venturi 24 of FIG. 1. Air enters the variable venturi 200 via air inlet 202, which is the airflow passage of the venturi with the largest cross-sectional area. Air subsequently passes through air filter 204 before entering the variable venturi throat 206. The adjustable sliding "egg" 208 restricts the cross-sectional area of the variable venturi throat 206, which leads to an increase in vacuum by the venturi effect. Inlet 210 may draw cooled exhaust from the exhaust gas recirculation conduit 66. Inlet 212 may draw purge vapor from the fuel vapor purge system conduit 96, power crankcase ventilation via conduit 76, and act as an aspirator (i.e., vacuum amplifier) via conduit 102 for vacuum-powered actuators (e.g., vacuum brakes, HVAC controls, wastegate actuation, and EGR actuation). The mixed air decelerates and recovers its pressure along the taper of egg 208 which forms a diverging nozzle with the inside housing surface. Mixed air exits the variable venturi 200 via 214, which leads to the compressor 122, charge air cooler 124, then throttle 120 before entering the combustion chamber 34.

While FIG. 2 shows one example of a variable venturi, various other configurations may be used, if desired.

The movement of the sliding "egg" of the venturi increases or decreases pressure (vacuum) supplied to a plurality of vacuum-utilizing devices or systems which may be coupled to it; for example the EGR system, the FVP system, the PCV system, and the vacuum amplifier in the example shown in FIG. 2. In other words, adjustment of the venturi may affect flow in each of the systems coupled with it, if such systems are flowing, since higher or lower vacuums may thus be applied as the variable venturi is adjusted.

FIG. 3 shows one embodiment of an overall control routine 300 for coordinating adjustment one or more of the variable venturi, the exhaust gas recirculation valve, the PCV valve (if active) and the fuel vapor purging valve in response to operating conditions. Specifically, one example, the routine coordinates control of the variable venturi and the EGR system, while providing a minimum vacuum for operation of another vacuum-utilizing device or system, such as the fuel vapor purging system, the brake booster, and/or others.

At 302, the routine determines a base position of the variable venturi and the EGR valve 70 based on the desired air flow rate and EGR flow rate for the current operating conditions. In one example, the venturi position may be selected that provides sufficient vacuum to achieve a target dilution level of EGR in the engine. Depending on operating conditions, there may be multiple acceptable combinations of venturi position and EGR valve positions to achieve a given EGR dilution rate (where a vacuum level of up to 0.3 bar may be used at the peak of EGR flow rate). In this case, to reduce pressure losses, the base position may be selected so that the EGR valve is first substantially fully opened (e.g., open greater than a threshold amount) to achieve the desired EGR flow, and then if still further EGR flow is desired, the venturi may be further restrict to increase vacuum applied to the EGR system, and thus increase EGR flow.

Next, at 304, the routine determined whether venturi vacuum or EGR flow feedback is enabled. If not, the position of the variable venturi is maintained at 306. Otherwise, if the vacuum or flow feedback is enabled at 304, the operation of fuel vapor purging is checked at 308. If fuel vapor purging is in operation at 308 (e.g., the fuel vapor purging control valve is at least partially open to admit vapors to the variable venturi), the fuel vapor purge system is checked for sufficient vacuum at 310. If the fuel vapor purge system does not have sufficient vacuum for purging at 310, the variable venturi is adjusted to increase vacuum to the fuel vapor purging system, and the EGR valve is correspondingly adjusted to maintain the desired EGR flow. Specifically, adjusting the variable venturi to increase vacuum to assist in fuel vapor purging may affect (increase in this example) EGR flow if the EGR flow it not sonic across the EGR valve. As such, by coordinating a corresponding decrease in the EGR valve position, it is possible to maintain desired EGR flow while providing sufficient fuel vapor purging vacuum.

If there is sufficient vacuum for fuel vapor purging at 310 or if fuel vapor purging is not in operation at 308, and if the engine coolant temperature is below a preset threshold value (e.g., during cold temperature conditions) while the PCV system is active, the vacuum in the PCV system is checked for sufficiency at 316. If there is insufficient PCV vacuum at 316, the variable venturi is adjusted to increase PCV vacuum. In one example, the variable venturi control action may include constricting the venturi throat just enough to achieve a moderate vacuum of 0.1 bar when PCV flow is scheduled.

If the brake booster is coupled with the venturi as in FIG. 1, the vacuum at the break booster is checked for sufficiency at 320. Sufficient brake booster vacuum is also checked at 320 following the adjustment of the variable venturi and EGR valve at 312 or 318. If there is insufficient brake booster vacuum at 320, the variable venturi is adjusted to increase the brake booster vacuum. For example, when the brake vacuum is less than a threshold amount (measured via a vacuum sensor 106 coupled to the brake booster 20 or inferred based on operating conditions), the variable venturi throat is constricted to increase vacuum to approximately 0.23 bar.

If the vacuum is increased to the brake booster at 322, the EGR valve is adjusted correspondingly to maintain the desired EGR at 322. Specifically, adjusting the variable venturi to increase vacuum for the brake booster (increasing vacuum in this example) can decrease EGR flow if the EGR flow it not sonic across the EGR valve. As such, by coordinating a corresponding decrease in the EGR valve position, it is possible to maintain desired EGR flow while providing sufficient brake booster vacuum Note that in an alternative example where the intake manifold additionally and/or alternatively provides vacuum to the brake booster through a check valve, the venturi need not be adjusted if manifold vacuum is present because the check valve can automatically select the deepest vacuum source, intake manifold or variable venturi.

Next, the EGR valve is checked for sufficiency in metering EGR flow at 324. Specifically, in one example, the routine monitors whether adjustments (if any) to the venturi to maintain sufficient vacuum for other vacuum-utilizing devices or systems, and the corresponding adjustments to the EGR valve to maintain desired EGR flow, result in the EGR valve being in a position of degraded control authority, such as fully open or fully closed. Thus, the routine may monitor whether sufficient EGR valve adjustments are available and whether the desired EGR flow is being maintained, further details of which are described with regard to FIG. 4. If not, the routine continues to 320 to adjust the venturi to increase/decrease vacuum to the EGR system.

FIG. 3 thus illustrates various approaches for coordinating control of the system of FIG. 1, where the variable venturi is coordinated with the EGR while at the same time being positioned to maintain sufficient vacuum for other vacuum-utilizing devices or systems, such as the fuel vapor purging system. Likewise, the vacuum-utilizing devices or systems may also be adjusted in coordination with EGR-driven adjustments of the variable venturi, as further described with regard to FIG. 5, for example.

FIG. 4 shows a routine 400 for adjusting the EGR valve in order to sufficiently meter EGR flow while the variable venturi is being adjusted to provide sufficient vacuum to other vacuum-utilizing devices or systems. At 402, the EGR valve is adjusted based on an error between the desired and actual EGR flow. If the EGR valve is open greater than the threshold amount (e.g., at the maximum open position) at 404, yet the desired EGR is not within a minimum threshold of actual EGR flow at 406 then the EGR is not sufficiently metering flow at 408 and the variable venturi is adjusted to increase vacuum to the EGR system. The EGR valve is then adjusted at 410 based on the variable venturi adjustment made at 408 and the desired EGR flow amount (e.g., feed forward compensation is provided that coordinates the EGR valve adjustment to the venturi adjustment). In this way, it is possible to maintain sufficient control authority of the EGR valve to meter EGR flow through adjustment (e.g., restriction) of the variable venturi. Further, as noted below with regard to FIG. 5, the adjustment to the venturi may affect other vacuum-utilizing devices or systems, which can also be compensated by the control system. Thus, overall system operation can be maintained—sufficient EGR flow and control authority, sufficient minimum vacuum to vacuum utilizing devices or systems, and accurate control of the vacuum-utilizing devices or systems even when the variable venturi is adjusted. This gestalt coordination thus provides improved engine operation under varying conditions.

Referring now to FIG. 5, it shows a routine 500 for adjusting a vacuum-utilizing device or system responsive to adjustments of the variable venturi. In this specific example, the routine adjusts the fuel vapor purging valve based on a change in the variable venturi position. First, the routine determines whether the variable venturi position is changed and/or commanded to change, such as at 302, for example. If so, when fuel vapor purging is in operation at 504 and the purge flow is approaching the maximum allowed purge flow for the current operating conditions at 506, the fuel vapor purging valve is adjusted (e.g., reduced) at 508 based on the change in venturi position.

In one particular example, the control system may adjust variable venturi to provide sufficient EGR flow, and at the same time, adjust the fuel vapor purging valve to compensate for adjustment to the variable venturi. For example, if vacuum is increased for EGR, the fuel vapor purging valve is restricted. In this way, not only is the desired EGR flow achieved, but also fuel vapor purge flow is controlled as well. Thus, it is possible to reduce transient air-fuel ratio affects in the engine due to aberrant fuel vapor flow.

In another example, if the vacuum supplied by the venturi is increased due to an increase in engine load because more EGR flow is schedule, and if fuel vapors are being purged at this same time, this situation may also cause fuel vapors to become greater than a maximum allowed amount. As such, the vacuum supplied to the FVP system is decreased by adjusting the FVP valve to maintain the desired purge flow within limits (by an amount proportional to and opposite to the venturi adjustment). In this way, it is possible to reduce the impact of any uncertainty in the hydrocarbon concentration of the vapors on engine air-fuel ratio control. Likewise, it is possible to reduce the potential for a large amount of vapors to engine the engine resulting in the fuel injector pulsewidth becoming too small possible leading to engine misfire. Note that while some of the above example are provided in terms of vacuum levels, desired flow rates may also be used (e.g., a desired fuel vapor purging flow, desired PCV flow, etc).

While FIG. 5 illustrates that coupling some vacuum-utilizing devices or systems to the variable venturi interconnects the systems dynamically, such interaction may be addressed through control of the vacuum-utilizing device or system itself, in coordination with the venturi and EGR systems. For example, even when varying the vacuum via the variable venturi to control EGR flow and coordinate with adjustment of the EGR valve, this affect of this vacuum variation on fuel vapor purging, for example, is addressed through coordinated control of the fuel vapor purging valve. Likewise, for passive vacuum-utilizing devices or systems, as long as sufficient vacuum is provided, variation of vacuum above this level can be tolerated, such as with regard to the PCV system.

Further, additional control action may be included when coordinate the EGR valve, variable venturi, and other vacuum-utilizing devices or systems. For example, adjustment of other vacuum-utilizing devices or systems may affect operation of the venturi, and thus affect the EGR flow. Therefore, the variable venturi and/or EGR valve may further be adjusted responsive to variation of the vacuum utilizing device or system. In one particular example, where the fuel vapor purging valve is adjusted to control fuel vapors (e.g., where the valve is restricted due to an increase in hydrocarbon concentration in the vapors), this may increase vacuum to the EGR system and thus increase EGR flow. As such, in one example, the control system may adjust venturi in response to the adjustment of the fuel vapor purging valve (e.g., reduce restriction in this example) to maintain vacuum level applied to the EGR system and/or adjust the EGR valve based on the adjustment of the fuel vapor purging valve (e.g., reduce EGR valve opening in this example). In still another example, the control system may adjust the fuel vapor purging valve to account for affects on the vacuum level due to changes in the EGR valve. For example, if the EGR valve reduces desired EGR flow while airflow is maintained, then vacuum to the fuel vapor purging system may increase. As such, the control system may decrease opening of the fuel vapor purging valve in response to the decrease in the EGR valve position, and vice versa.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method of controlling engine operation of an engine having an exhaust gas recirculation system and a fuel vapor purging system, the method comprising:
    delivering exhaust gas recirculation flow from the exhaust gas recirculation system to a variable venturi coupled in an intake of the engine;
    delivering fuel vapor flow from the fuel vapor purging system to the variable venturi coupled in an intake of the engine; and
    coordinating adjustment of an exhaust gas recirculation valve coupled to the exhaust gas recirculation system, a fuel vapor purging valve coupled to the fuel vapor purging system, and the variable venturi in response to operating conditions.

2. The method of claim 1 wherein the coordinating includes:
    adjusting the fuel vapor purging valve in response to adjustment of the variable venturi.

3. The method of claim 1 wherein the coordinating includes:
    adjusting the exhaust gas recirculation valve in response to adjustment of the variable venturi.

4. The method of claim 1 wherein the coordinating includes:
    adjusting venturi in response to adjustment of the fuel vapor purging valve.

5. The method of claim 1 wherein the coordinating includes:
    adjusting venturi in response to adjustment of the exhaust gas recirculation valve.

6. The method of claim 1 wherein the coordinating includes:
    adjusting the fuel vapor purging valve in response to adjustment of the exhaust gas recirculation valve.

7. The method of claim 1 wherein the coordinating includes:
    adjusting the exhaust gas recirculation valve in response to adjustment of the fuel vapor purging valve.

8. A system for an engine, comprising:
    a variable venturi coupled in an intake of the engine;
    an exhaust gas recirculation system having an exhaust gas recirculation flow path, the exhaust gas recirculation flow path coupled to the variable venturi; and
    a vacuum-utilizing device or system coupled to the variable venturi.

9. The system of claim 8 wherein the vacuum-utilizing device includes a fuel vapor purging system having a fuel vapor flow path, the fuel vapor flow path coupled to the variable venturi.

10. The system of claim 8 wherein the vacuum-utilizing device or system includes a positive crankcase ventilation system.

11. The system of claim 8 wherein the vacuum-utilizing device or system includes a brake booster.

12. The system of claim 8 wherein the vacuum-utilizing device or system includes a vacuum actuated control valve.

13. The system of claim 8 wherein the venturi is coupled upstream of a compressor of a turbocharger of the engine.

14. A method of controlling engine operation of an engine having an exhaust gas recirculation system, a crankcase ventilation system, a vacuum brake system, and a fuel vapor purging system, the method comprising:
    delivering exhaust gas recirculation flow from the exhaust gas recirculation system to a variable venturi coupled in an intake of the engine;
    delivering fuel vapor flow from the fuel vapor purging system to the variable venturi;
    delivering crankcase gases from the crankcase ventilation system to the variable venturi;
    boosting outlet gases of the variable venturi; and
    adjusting the variable venturi in response to brake booster vacuum, operation of the fuel vapor purging system, and operation of the exhaust gas recirculation system.

15. The method of claim 14 wherein the exhaust gas recirculation system, the crankcase ventilation system, the vacuum brake system, and the fuel vapor purging system are coupled to a vacuum generated by the variable venturi.

16. The method of claim 15 further comprising adjusting a fuel vapor purging valve coupled in the fuel vapor purging system in response to adjustment of one or more of the variable venturi and an EGR valve coupled in the EGR system.

17. The method of claim 16 further comprising decreasing fuel vapor purge flow via the fuel vapor purging valve when constricting the variable venturi.

18. The method of claim 16 wherein the exhaust gas recirculation system is coupled downstream of a turbine of a turbocharger coupled to the engine.

19. The method of claim 18 wherein the positive crankcase ventilation system includes a single oil baffle and is a uni-directional flow system.

* * * * *